United States Patent [19]

Tellert

[11] 4,177,494
[45] Dec. 4, 1979

[54] CIRCUIT ARRANGEMENT FOR PRODUCING AN OPEN MAGNETIC FIELD

[75] Inventor: Rudy Tellert, Schweinfurt, Fed. Rep. of Germany

[73] Assignee: Sachs Systemtechnik GmbH, Schweinfurt, Fed. Rep. of Germany

[21] Appl. No.: 849,666

[22] Filed: Nov. 8, 1977

[30] Foreign Application Priority Data

Nov. 11, 1976 [DE] Fed. Rep. of Germany ....... 2651516

[51] Int. Cl.² .......................... H02H 7/10; H02M 7/48
[52] U.S. Cl. .................................. 361/152; 219/10.77; 363/39; 361/113
[58] Field of Search ............... 361/143, 146, 152, 153, 361/159, 113; 363/39, 40, 41; 219/10.49, 10.75, 10.77, 10.79; 331/62, 105, 108 A, 109, 117 R, 117 D, 167; 333/76-78

[56] References Cited

U.S. PATENT DOCUMENTS

| 3,395,327 | 7/1968 | Kaiser et al. ...................... 363/39 X |
| 3,461,372 | 8/1969 | Pickup et al. ........................... 363/40 |
| 3,806,688 | 4/1974 | MacKenzie et al. ......... 219/10.77 X |
| 3,903,469 | 9/1975 | Ravas ..................................... 363/40 |
| 4,017,701 | 4/1977 | Mittelmann ................... 219/10.77 X |

FOREIGN PATENT DOCUMENTS 2453924 5/1976 Fed. Rep. of Germany .......... 361/113

Primary Examiner—Patrick R. Salce
Attorney, Agent, or Firm—Toren, McGeady and Stanger

[57] ABSTRACT

A magnetic field for coupling to a load is produced by means of apparatus having first and second amplifiers operating in phase opposition and connected to a first oscillating circuit for generating a first oscillating voltage of predetermined fundamental frequency, an inductor producing the magnetic field being an element of the first oscillating circuit. A second oscillating circuit connected to the first circuit furnishes a second oscillating voltage having a frequency corresponding to the third harmonic of the fundamental frequency and includes a coil positioned relative to the load in such a manner that substantially no energy is transferred from the coil to the load.

6 Claims, 2 Drawing Figures

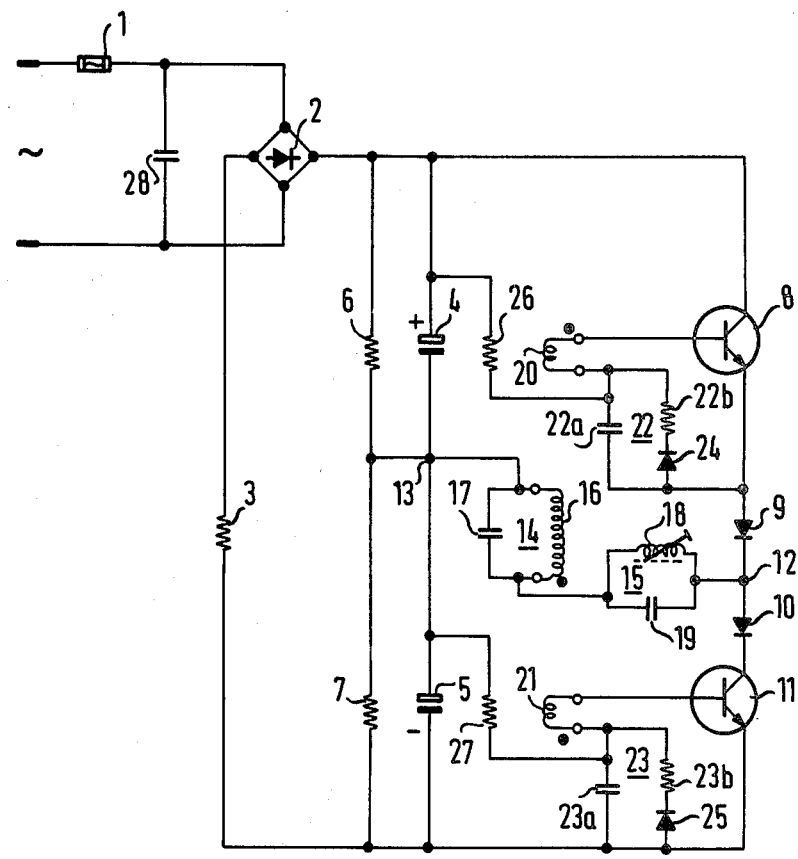

CIRCUIT ARRANGEMENT FOR PRODUCING AN OPEN MAGNETIC FIELD

This invention relates to a circuit arrangement for producing an open magnetic field including at least two transistors timed in opposite phase relationship; a first oscillating circuit associated therewith and having an inductor which simultaneously constitutes the induction coil producing the magnetic field; a second oscillating circuit arranged in series circuit with the first oscillating circuit and tuned to the third harmonic of the fundamental frequency to which the first oscillating circuit is tuned, the inductors of the oscillating circuits being arranged not to damp each other; and means for furnishing a collector current pattern suitable for producing an approximately rectangular voltage pattern by addition of the resulting two resonant voltages.

A circuit arrangement for producing an open magnetic field is known from German published patent application No. 24 53 924.

Such an open magnetic field may be used for transmitting electric energy inductively over a distance in space from the induction coil of the circuit arrangement to a load, such as an object to be heated by eddy current or hysteresis losses or an electrically operated secondary device of any kind. The initially described known circuit arrangement achieves improved efficiency as compared to previously known circuit arrangements, by the fact that the load circuit of the transistors timed in opposite phase relationship consists of two series-connected, parallel oscillating circuits of which one is tuned to a fundamental frequency and the other to the third harmonic. The transistors energizing the oscillating circuits should preferably operate in the switching mode for avoiding high switching losses, that is, be shifted as quickly as possible from the blocked state to the conductive state and vice versa. This means that the collector voltage of the transistors is almost rectangular in shape and contains, in addition to the fundamental frequency, higher harmonies of which the share of the third harmonic is highest. The parallel oscillating circuit tuned to the fundamental frequency offers relatively little impedance to the frequency of the third harmonic. In the absence of the additional parallel oscillating circuit tuned to the third harmonic, relatively great currents of the third harmonic could flow through the first oscillating circuit and would result in corresponding switching losses. These losses thus are avoided by the supplemental parallel oscillating circuit which has a very high impedance at frequencies of the third harmonic so that the efficiency of the circuit arrangement, when operating under load, was improved, and the no-load losses of the circuit could be reduced.

The sum of the oscillating circuit voltages of the two parallel oscillating circuits results essentially in the desired rectangular pattern. It was assumed in the proposed circuit arrangement that this rectangular shape of the summed voltage, can be maintained under load only if both oscillating circuits are loaded in the same manner. This means that the inductors of both oscillating circuits must be coupled inductively with the load to be connected thereto. Because, however, the two inductors must be decoupled from each other, there results a very complicated structure, particularly in the application of the circuit to cooking devices, warm holding devices, or the like in which the induction coil of the circuit to be coupled to the load consists best of a pancake coil. The proposed circuit arrangement requires an induction pancake coil structure which includes both inductors of the first oscillating circuit and of the second oscillating circuit, the two inductors having to be decoupled from each other. Aside from the difficulty of producing such a coil structure, a further difficulty resides in the fact that the resonant frequency of the second oscillating circuit must be tuned to the third harmonic of the fundamental frequency by the capacitor of the second oscillating circuit. Because the fundamental frequencies of several identically constructed circuits will never agree precisely because of manufacturing tolerances, it is necessary to select the suitable capacitor for the second oscillating circuit of each individual circuit arrangement and to solder it in. A change in the inductivity of the pancake coil of the second oscillating circuit for adjusting the resonant frequency is not possible in the known circuit arrangement.

The object of the invention resides in further developing the initially described circuit arrangement in such a manner as to make possible a simpler, and thereby cheaper induction coil design combined with lower adjusting cost for the second oscillating circuit.

This object is achieved by spatially arranging the inductor of the second oscillating circuit in such a manner that it does not contribute to the open magnetic field produced.

It has been found that the advantageous effect of the second oscillating circuit tuned to the third harmonic is maintained when operating under load even when this oscillating circuit is not damped by inductive coupling with the load in the manner of the first circuit. When the first oscillating circuit, tuned to the fundamental frequency, is loaded by inductive coupling of its induction coil to a load, its oscillating circuit voltage decreases. In order to maintain an approximate rectangular shape of the sum of the oscillating circuit voltage of the first parallel oscillating circuit and that of the second parallel oscillating circuit, the latter oscillating circuit voltage must decrease in approximately the same proportion as that of the first oscillating circuit. However, this decrease in the oscillating circuit voltage of the second oscillating circuit occurs also during exclusive external loading of the first oscillating circuit because the second oscillating circuit is damped by the current increasingly drawn by the first oscillating circuit with increasing load. Inductive coupling of the coil of the second oscillating circuit with the load thus is not necessary for damping this second oscillating circuit. The inductor of the second oscillating circuit, therefore, need not be arranged in a single pancake induction coil structure together with the inductor of the first oscillating circuit, but may be arranged at any desired place. The structure of the induction pancake coil is substantially simplified thereby because it no longer needs to consist of two separate inductors which must be decoupled from each other. The necessary decoupling of the inductors of the first oscillating circuit and of the second oscillating circuit can be achieved in a simple manner by arranging the inductor of the second oscillating circuit, preferably designed as a small cylindrical coil or the like, within a housing of the circuit arrangement spatially separated from the inductor of the first oscillating circuit.

Because of the separate arrangement of the inductors of the two oscillating circuits according to the invention, it is possible to make the inductor of the second oscillating circuit a coil whose inductance may be varied by means of a core. It is no longer necessary, therefore, to adjust the resonant frequency of the second oscillating circuit to the third harmonic of the fundamental frequency of the first oscillating circuit by separately soldered-in capacitors, but this may be performed simply by adjusting the inductance of the coil of the second oscillating circuit.

Another advantageous development of the invention resides in the fact that the transistors and at least the first oscillating circuit constitute and oscillator self-excited to the fundamental frequency, that the base circuit of each transistor includes a feedback coil, and that the feedback coil is arranged in direct inductive coupling with the inductor of the first oscillating circuit. If a flat induction coil arrangement incudes both the inductor of the first as well as that of the second oscillating circuit in a manner as not to damp each other, as in the known circuit arrangement, it is possible only at non-acceptable cost, if at all, to arrange feedback coils for control of the transistors in such a manner that they are arranged in direct inductive coupling with the inductor of the first oscillating circuit, but not simultaneously with that of the second oscillating circuit. The known circuit arrangement, therefore, provides control voltages for the transistors by means of a separate transformer whose primary winding is connected parallel to the first oscillating circuit, and whose two secondary windings control the two transistors in opposite phase relationship. Because the induction coil structure coupled with the load according to the invention contains only the inductor of the first oscillating circuit, two feedback coils may be provided in this arrangement without difficulties for controlling the transistors in opposite phase relationship, whereby the structure of the induction coils is not made significantly more ocmplicated, and the cost of an additional transformer can also be avoided.

The invention is described in more detail hereinbelow with reference to the appended drawing showing an exemplary embodiment.

FIG. 1 is a schematic of a circuit arrangement of the invention; and

FIG. 2 is a perspective, fragmentary view of elements of the arrangement of FIG. 1.

FIG. 1 illustrates a circuit arrangement of the invention. The circuit arrangement may be connected to an alternating current supply through a fuse 1 and a bridge rectifier 2. The direct-current terminals of the bridge rectifier 2 are connected with a series circuit of a low-impedance resistor 3 and of two capacitors 4, 5. A resistor 6 is connected in parallel to the capacitor 4, and a resistor 7 is connected in parallel to the capacitor 5. The resistors 6, 7 balance the voltages across the two capacitors 4, 5. A series circuit of a transistor 8, two diodes 9, 10, and a transistor 11 is arranged in parallel to the series circuit of the two capacitors 4, 5. The series circuit of a first parallel oscillating circuit 14 and a second parallel oscillating circuit 15 is arranged between the juncture 12 of the two diodes 9, 10 and the juncture 13 of the two capacitors 4, 5. The first parallel oscillating circuit 14 consists of an inductor 16 and a capacitor 17. The second parallel oscillating circuit 15 consists of an inductor 18 and a capacitor 19. The inductor 16 constitutes the induction coil capable of being coupled with a non-illustrated load for inductive transfer of energy. The inductor 16 may be a flat coil, for example, for heating food or keeping it warm in a container or a cooking vessel coupled thereto. The inductor 16, however, may also be transformer-coupled with the induction coil, also not illustrated, of a secondary device.

A series circuit of a feedback coil 20 or 21 and an RC element 22 or 23 is connected between the base and emitter of each transistor 8, 11. The two RC elements 22, 23 consist essentially of a parallel circuit of a capacitor 22a, or 23a, and a resistor 22b, or 23b. Respective diodes 24, 25 to be referred to below are arranged in series with the resistors 22b, 23b. The feedback coils 20, 21 are transformer coupled with the inductor 16 of the first parallel oscillating circuit 14 so that the control voltages for the transistors are induced therein. The feedback coils 20, 21 are connected with opposite polarity for control of the transistors 8, 11 in phase opposition. Because of the feedback of the oscillating circuit voltage of the first oscillating circuit 14 by the feedback coils 20, 21 to the bases of the transistors 8, 11, there is formed a self-excited oscillator whose fundamental frequency is determined by the resonant frequency of the oscillating circuit 14. The turn ratio of the inductor 16 of the first oscillating circuit 14 and of the feedback coils 20, 21 is chosen in such a manner that a relatively high control voltage is available for the transistors. A base current of substantially rectangular pattern for the transistors can be achieved by means of the RC elements 22, 23. When the switching-on phase of the transistor 8, for example, starts, the capacitor 22a is almost completely discharged so that the base current can rise quickly in order to bring the transistor 8 to saturation. Depending on the time constant of the RC element, the capacitor 22a is slowly charged by the base current in such a manner that its terminal directed toward the base becomes more negative than the terminal directed toward the emitter. The capacitor voltage thus is opposed to the control voltage from the feedback coil 20 and causes early blocking of the collector current of the transistor 8 before the collector-emitter voltage rises again. During the blocked state of the transistor 8, the capacitor 22a is discharged through the diode 24 and the resistor 22b. A resistor 26 is arranged between the positive terminal of the capacitor 4 and the base-connected terminal of the RC element 22. A corresponding resistor 27 is arranged between the positive terminal of the capacitor 5 and the base-connected terminal of the RC element 23. The resistors 26, 27 of relatively high impedance, in cooperation with the diodes 24, 25 respectively, assist in starting the oscillator. As long as the oscillator has not started, the capacitors 22a, 23a are not yet charged so that no negative potential is present at their base-connected terminals. The diodes 24, 25 are still blocked in this condition. It is the function of the diodes 24, 25 to prevent the voltage reaching the base through resistors 26, 27 for assisting oscillator start-up from being determined by the ratio of the impedances of the resistor 26, 22b and 27, 23b. Such a voltage division would constitute a problem in that the resistors 22b, 23b are of relatively low impedance. Because of the diodes 24, 25, high-resistance resistors 26, 27 can be employed for assisting the start of oscillations regardless of the low-resistance resistors 22b, 23b.

The second parallel oscillating circuit 15 is tuned to the third harmonic of the resonant frequency of the first oscillating circuit 14. The inductor 18 of the second oscillating circuit does not contribute to generating the open magnetic field according to the invention, and is thus not coupled to load which is to be supplied with energy. The inductor 18, therefore, may assume any desired shape, for example, that of a cylindrical coil equipped with a core so that the resonant frequency of the second oscillating circuit 15 can be adjusted by changing the inductance of the coil 18. The sum of the oscillating circuit voltages, that is the voltage between the junctions 12, 13, follows an approximately rectangular pattern which results from the superposition of a voltage of the fundamental wave and of a voltage of the third harmonic. The ratio between the fundamental voltage and the harmonic voltage necessary for producing the almost rectangular course of the added voltages is not adversely affected by the fact that only the inductor 16 of the first oscillating circuit 14 is coupled with the load when operating under load, and that only the first oscillating circuit is thus directly damped by the load. When operating under load, the first oscillating circuit draws a load-dependent current which also flows through the second oscillating circuit 15. This current damps the oscillating circuit 15 so that its oscillating circuit voltage decreases during operation under load in the same manner as that of the first oscillating circuit 14.

The diodes 9, 10 prevent inverse operation of the transistors 8, 11 which could occur in the absence of these diodes due to overvoltages across the oscillating circuit. The resistor 3 provides protection to the bridge rectifier 2 in limiting current. Additionally, the resistor 3, in combination with the capacitor 28 arranged parallel to the alternating current terminals, constitutes a low-pass filter which prevents the feed-back of high-frequency currents into the alternating voltage mains and suppresses radio interference.

FIG. 2 shows the cylindrical coil 18 which is the inductor of the second oscillating circuit arranged in a housing 30, and thereby separated from the flat coil 16 which is the inductor of the first oscillating circuit.

I claim:

1. In apparatus for producing a magnetic field for coupling to a load, said apparatus having at least a first and second amplifier element operating in phase opposition, and first oscillating circuit means connected to said first and second amplifier element for generating a first oscillating voltage having a predetermined fundamental frequency, said first oscillating circuit means comprising inductor means for producing said magnetic field, the improvement which comprises second oscillating circuit means connected to said first oscillating circuit means for furnishing a second oscillating voltage having a frequency corresponding to the third harmonic of said fundamental frequency, said second oscillating circuit means comprising a coil positioned relative to said load such that substantially no energy is transferred from said coil to said load.

2. Apparatus as set forth in claim 1, wherein said inductor means comprises a flat coil; and wherein said coil of said second oscillating circuit means is a cylindrical coil spaced away from said flat coil so that said load is outside of the magnetic field of said cylindrical coil.

3. Apparatus as set forth in claim 1, wherein said coil of said second oscillating circuit means is a coil having a variable inductance, whereby the resonant frequency of said second oscillating circuit means may be adjusted by changing the inductance of said coil.

4. Apparatus as set forth in claim 1, wherein said first and second amplifier elements are transistors.

5. Apparatus as set forth in claim 4, further comprising means for interconnecting said first oscillating circuit means and said transistors to form a self-excited oscillator.

6. Apparatus as set forth in claim 5, wherein each of said transistors has a base circuit; and wherein each of said base circuits comprises a feedback coil inductively coupled to said inductor means of said first oscillating circuit means.

* * * * *